July 3, 1962   D. B. KREIDER ET AL   3,041,912
HONEYCOMB SPACER STUD AND INTERLOCKING GROMMET
Filed Nov. 25, 1958

INVENTORS
DAVID B. KREIDER
FRED M. DELGADILLO
BY
Lynn H. Latta
ATTORNEY

United States Patent Office 3,041,912
Patented July 3, 1962

3,041,912
HONEYCOMB SPACER STUD AND INTERLOCKING GROMMET
David B. Kreider and Fred M. Delgadillo, Santa Ana, Calif., assignors to Shur-Lok Corporation, Anaheim, Calif., a corporation of California
Filed Nov. 25, 1958, Ser. No. 776,346
3 Claims. (Cl. 85—1)

This invention relates to devices for effecting attachments between panels of lightweight sandwich construction and other parts such as structural members carrying such panels or accessory parts and trim requiring attachment to the panels. The invention is especially applicable to panels of metal sandwich construction embodying spaced skin sheets and relatively fragile honeycomb cellular core structure such as are used for example in airframe construction where a factor of maximum strength versus minimum weight is an essential requirement.

The general object of the invention is to provide an improved sectional fastener embodying a spacer part, a grommet part for securing the spacer part in the panel, bridging between the two skin sheets, and a stud part preferably threaded) projecting externally of the panel and providing the means for direct attachment to an external member.

The invention contemplates an improved fastener unit wherein the spacer and grommet parts each include a head adapted to engage one face of the panel and a stem section adapted to be coupled to the stem section of the other part by means of cooperating coupler elements on the respective parts, whereby the fastener when installed embodies a double-headed spacer with heads adapted to be pressed tightly against or countersunk in the skin sheets of the panel, and being joined by a sectional stem extending through the panel, the stud part projecting externally of this spacer assembly.

An object of the invention is to provide such a fastener which, when attached to the panel, will not readily pull loose, will prevent crushing of the honeycomb core structure of the panel except in its immediate vicinity and will distribute compression and shear loads to the panel.

Figure 1:
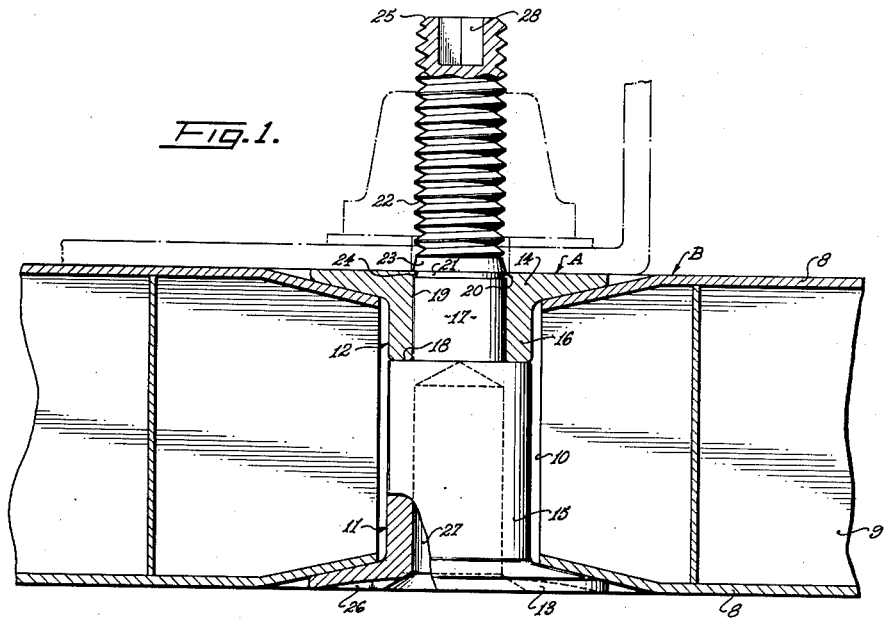
Figure 3:
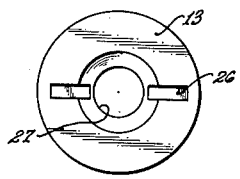
Figure 4:
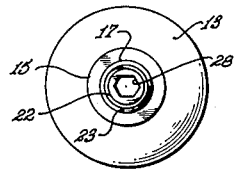
Figure 5:
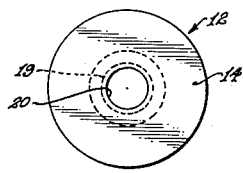
Figure 2:
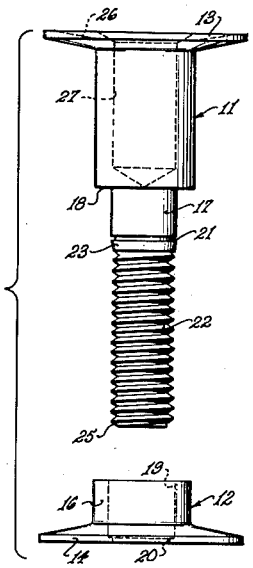

Other objects and advantages will become apparent in the ensuing specification and appended drawing in which:

FIG. 1 is a sectional view of a fastener embodying my invention as installed in a sandwich type panel;
FIG. 2 is an exploded sectional view of the fastener prior to assembly in a panel;
FIG. 3 is a head-end view of the spacer and stud part;
FIG. 4 is a tip-end view of the same part; and
FIG. 5 is a head-end view of the grommet part.

Referring now to the drawings in detail, and in particular to FIG. 1, I have shown therein, as an example of one form in which the invention may be embodied, a fastener assembly generally indicated at A, installed in a sandwich type panel indicated generally at B. The panel B comprises a pair of relatively tough skin sheets 8 joined to the respective edges of a series of extremely thin strips of metal formed and joined into a honeycomb cellular core structure 9. Preparatory to installing a fastener A in the panel, a hole 10 is drilled through the panel.

The fastener A comprises, in general, a spacer part 11 and a grommet part 12 having respective heads 13 and 14 and respective stem sections 15 and 16. The stem section 15 has a neck 17 of reduced diameter, a radial shoulder 18 being defined at the base of neck 17. The stem section 16 is in the form of a cylindrical collar defining a cylindrical bore 19 adapted to freely but snugly receive the neck 17. The head 14 is provided with an annular lip 20 overhanging the outer end of the bore 19 and receivable in an annular groove 21 in the external wall of neck 17 at its outer end.

Formed integrally with the spacer part 11 is a fastener stud 22 which is preferably provided with a male thread for cooperation with a nut in securing parts to the honeycomb panel. Stud 22 has at its base an expander mandrel 23 joining it integrally to the neck 17, the mandrel 23 being defined by a frusto conical external wall having a taper of approximately 11° (e.g. in the range between 10° and 13°). An undercut shoulder 24 is provided at the radial plane where mandrel 23 joins the neck 17 and defines one side of the annular groove 21.

Stud 22 has an end chamfer 25 functioning to facilitate the entry of the stud into the collar 16 and into the opening defined by lip 20 in the assembling operation hereinafter described.

Spacer head 13 is preferably provided with a driver slot 26, and may have an axial recess 27 to eliminate unnecessary weight. The tip of stud 22 is preferably provided with a polygonal socket 28 for reception of an Allen wrench, either the driver slot 26 or socket 28 being selectively usable for holding the stud against rotation while the nut is being driven thereon, depending upon whether it is more convenient to hold the fastener at one end or the other.

At this point it may be noted that in the installation of the fastener, the parts 11 and 12 are brought together by inserting them into the opening 10 of the panel from opposite ends thereof, inserting the stud 22 into the bore 19 of collar 16, and through the opening defined by lip 20, causing the expander mandrel 23 and neck 17 to follow into the collar 16 until the cone 23 enters the opening within lip 20, and then applying sufficient end pressure to the respective parts to force the mandrel 23 through the opening of lip 20, spreading the lip 20 and compressing the mandrel until the shoulder 24 snaps past the lip 20 and engages the outer end face of the head 14 in the position shown in FIG. 1. The diameter of mandrel 23 at the shoulder 24 is approximately the diameter of neck 17, while the minimum diameter of the expander cone 23 where it joins the thread of stud 22, is approximately the same as the outer diameter of the male thread of stud 22, and is the same as or very slightly smaller than the inner diameter of lip 20. As a result, when bringing the two parts of the fastener together (by inserting the stud 22 into the larger end of collar 16 and thence through the restricted opening defined by lip 20) the peripheral edge of expander mandrel 23 at its base will pilot within the bore 19 of collar 16 to position the smaller end of the mandrel 23 accurately in coaxial relation to the inner margin of lip 20 so that, despite the fact that the entering end of the mandrel 23 may be of the same diameter as the opening in lip 20, it can be readily pushed into the opening to start the expanding action of the mandrel against the lip 20.

The preferable method of assembly is to first insert the spacer part 11 through the opening 10, bringing the head 13 into engagement with the adjacent skin sheet 8, and then to drop the grommet part 12 over the stud 22, the chamfer 25 facilitating the entry of the stud into the collar 16 and then into the opening defined by lip 20. As the end of collar 16 reaches the expander mandrel 23, the piloting engagement of the stud 22 within collar 16 will provide sufficient coaxiality between the parts to cause the mandrel 23 to freely enter the collar 16. Thence the periphery of mandrel 23, at its base, will provide a piloting action within the bore 19 of collar 16 to more accurately center the parts to the extent that the cylindrical neck 17 will readily follow the mandrel 23 into the bore 19 of the collar. This further increases the accuracy of coaxiality between the parts, to the extent that as the smaller end of mandrel 23 meets the lip 20 it will readily enter the opening defined by the lip 20 in response to compressive loading of the respective parts 11 and 12, and as the pressure is increased the mandrel 23 will force its way through the lip opening and past the lip, causing the lip 20 to become seated in the groove 21 and the shoulder 24 to lock against the outer end face of head 14 as disclosed in FIG. 1. The parts are so proportioned that the end of collar 16 will then seat against the shoulder 18 of the spacer stem 15.

The heads 13 and 14 may be of countersunk type as shown, and the overall aggregate length of the fastener between the heads may be such that when the parts are locked together the heads 14 will be countersunk in the skin sheets 8, dimpling the same in the final stages of assembly, to provide countersunk recesses receiving the heads in flush relation to the outer faces of the panel.

We claim:

1. In a fastener for anchorage in a through opening in a sandwich panel embodying spaced parallel skin sheets and a low density honeycomb core: a spacer including at one end a head adapted for compressive engagement with one of said skin sheets, a stem adjoining said head, adapted to extend into said opening, and terminating in an annular abutment shoulder, and a reduced neck extending coaxially from said shoulder, the combined length of said stem and neck being approximately equal to the thickness of said panel, a frusto-conical expander mandrel, having a taper of less than 15° with reference to the spacer axis, and having a larger end integrally joined coaxially with the end of said neck, and a threaded stud integrally joined to the smaller end of said mandrel and projecting coaxially therefrom, the larger diameter of said mandrel being approximately equal to that of said neck and the smaller diameter thereof being approximately equal to the outer diameter of said threaded stud, said spacer having an annular groove defined between said larger end of the mandrel and the adjacent end of said reduced neck, the respective side margins of said groove being defined by the respective end margins of said larger end of the collar and said stem; and a grommet comprising a circumferentially continuous cylindrical collar having a bore of a diameter as to snugly but freely receive said neck, having an inner end to seat against said annular abutment shoulder, and having at its outer end an annular head including a circumferentially continuous annular lip projecting radially inwardly from the wall of said bore and axially spaced from said inner end of the collar at a distance such as to be received in said annular groove when said inner end is seated against said abutment shoulder, thereby locking the grommet to said spacer, said annular head being positioned for compressive engagement with the other of said skin sheets around said opening when the grommet is thus locked to the spacer, said lip having an axial width just slightly less than that of said groove, having an inner diameter slightly smaller than the larger end diameter of said mandrel and at least as large as the outer diameter of said threaded stud, whereby said grommet may be freely slid over said threaded stud until said lip engages said expander mandrel, and whereby said grommet may then be forced axially over said mandrel, with said lip being expanded by said mandrel positively positioned in acurate registration therewith by the piloting action of said neck in said collar until it passes the larger end of said mandrel and drops into said groove.

2. A fastener as defined in claim 1, wherein said mandrel taper is in the range between 10° and 13°.

3. A fastener as defined in claim 1, wherein said mandrel has a conical taper of approximately 11° with reference to the spacer axis.

References Cited in the file of this patent
UNITED STATES PATENTS

| | | |
|---|---|---|
| 1,686,780 | Wigginton | Oct. 9, 1928 |
| 2,192,322 | Mitchell | Mar. 5, 1940 |
| 2,700,172 | Rohe | Jan. 25, 1955 |
| 2,709,470 | Knohl | May 31, 1955 |
| 2,761,484 | Sternick | Sept. 4, 1956 |